United States Patent

[11] 3,610,893

[72] Inventors Chris A. Clark, II;
Peter R. Cowger, both of Santa Barbara, Calif.
[21] Appl. No. 865,688
[22] Filed Oct. 13, 1969
[45] Patented Oct. 5, 1971
[73] Assignee Automation Technology, Inc.
Santa Barbara, Calif.

[54] TEMPLATE METHOD FOR PREPARING ALPHANUMERIC RECORDS
3 Claims, 2 Drawing Figs.
[52] U.S. Cl. .................................................. 235/61.11 E, 235/61.12 R
[51] Int. Cl. ..................................................... G06k 7/10, G06k 19/06
[50] Field of Search ............................................ 235/61.12, 61.115, 61.115 CR; 340/146.3

[56] References Cited
UNITED STATES PATENTS
2,525,837  10/1950  Simplair ...................... 235/61.12
2,964,734  12/1960  West ........................... 340/146.3
3,058,093  10/1962  Vernon et al. ................ 340/146.3
FOREIGN PATENTS
987,280  3/1965  Great Britain ................ 235/61.12

*Primary Examiner*—Thomas A. Robinson
*Attorneys*—Robert F. Conrad and Kurt Shaffert ABSTRACT: A method for preparing a computer tax data compilation comprises the steps of aligning a record medium with a template having tax form information imprinted thereon, manually recording arabic numerals representative of tax information on the record medium through openings in the tax form template, aligning the record medium in a predetermined manner for passage by an optical scanner, optically scanning the manually recorded numerals on the record medium, generating signals representative of the manually recorded numerals, and electronically storing the signals representative of the manually recorded numerals in order to prepare a computer tax data compilation.

INVENTORS
CHRIS A. CLARK II
PETER R. COWGER

TEMPLATE METHOD FOR PREPARING ALPHANUMERIC RECORDS

The present invention relates to a method for preparing tax returns. More particularly, the present invention relates to a method for preparing computerized tax returns.

The preparation of tax returns is a tedious and laborious task requiring a large number of computations that must be accurately performed. Since an accountant's time may be spent more profitably in other endeavors and since tax return computations are standardized to a large extent, the preparation of tax returns is an ideal area to enlist the services of a computer. Thus, the computer can perform the numerous computations more rapidly and more accurately than a skilled accountant.

In view of the above, numerous systems have been devised to prepare tax returns by computer. However, these systems, although somewhat successful, have suffered from a serious drawback, namely, the large amount of labor and accompanying expense required to convert information in conventional handwritten form into computer machine language. Usually this conversion is effected by keypunching techniques which require the punching of numerous openings in computer data cards.

Efforts have been made to alleviate this problem through the use of optical scanning methods wherein handwritten numerals are optically scanned to produce electrical signals representative of the handwritten numerals. However, it has been found that at least some of the numerous handwritten entries on tax forms prepared for optical scanning contain errors consisting of numerals that extend at least partially into areas outside the areas to be scanned. This causes numerical errors which cannot be tolerated. Therefore, the use of optical scanning methods in the preparation of computerized tax returns has not been widely adopted. Accordingly, most computerized tax returns are prepared utilizing a card keypunch operator to translate information in conventional handwritten form to computer machine language. As stated above, this is both expensive and time consuming.

Accordingly, it is an object of the present invention to provide a computerized tax method that is less time consuming, less expensive and just as accurate, if not more so, than prior art computerized tax systems.

It is an additional object of the present invention to provide a computerized tax method wherein optical scanning may be utilized without the occurrence of nontolerable numerical errors.

It is a further object of the present invention to provide a computerized tax method utilizing optical scanning wherein a tax form template is utilized in order to restrict the recordation of data to be optically scanned to certain predetermined areas.

It is yet another object of the present invention to provide a computerized tax method wherein the combination of a tax form template affixed to a backing sheet provides accurate alignment of information to be processed by an optical scanner.

It is an additional object of the present invention to provide a computerized tax method wherein a plurality of tax form templates having different tax information thereon may be utilized with interchangeable record media.

It is a further object of the present invention to provide a computerized tax method wherein there is no necessity to maintain large quantities of different forms in stock for ready use.

It is yet another object of the present invention to provide a computerized tax method that completely eliminates the need for costly and time-consuming keypunching of computer data cards.

Other objects will appear hereinafter.

The above-mentioned objects of the present invention and other desirable objectives are achieved utilizing a computerized tax method employing a plurality of templates, each template having tax information imprinted thereon corresponding to a particular form. Each tax form template is fixedly adhered to a backing sheet along two adjacent sides thereof. Therefore, a blank record medium of the same size as the tax form template may be inserted between the tax form template and the backing medium utilizing the joined edges of the backing sheet and the tax form template for alignment purposes.

Data is recorded upon the record medium through the apertures of each tax form template at designated places indicated by the information imprinted upon the face of the tax form template. Since recordation may be effected upon the record medium only at the location of an aperture, the areas of recordation are effectively restricted to predetermined areas. Therefore, the data recorded on the record medium may be optically scanned without appreciable fear of error since recordation outside of the areas to be scanned is effectively prevented.

Each tax form template has aperture openings therein whereby data may be recorded to indicate the usage of that particular form. Therefore, interchangeable record media may be utilized with each one of a set of different tax form templates. Thus, it is not necessary to utilize a different record medium with each different tax form template. Accordingly, the usage of interchangeable record media eliminates the necessity to maintain a stock of different record media resulting in significant savings in printing costs.

Since recordation outside of given areas necessitates the keypunching of computer data cards if optical scanning is to be successfully accomplished, and since recordation utilizing the tax form templates of the present invention is effectively restricted to the areas revealed by aperture openings, the need for keypunching is successfully eliminated with the computerized tax method of the present invention.

For the purpose of illustrating the invention, there is shown in the drawings a form which is presently preferred, it being understood, however, that the invention is not limited to the precise arrangements and instrumentalities shown.

Figure 1:
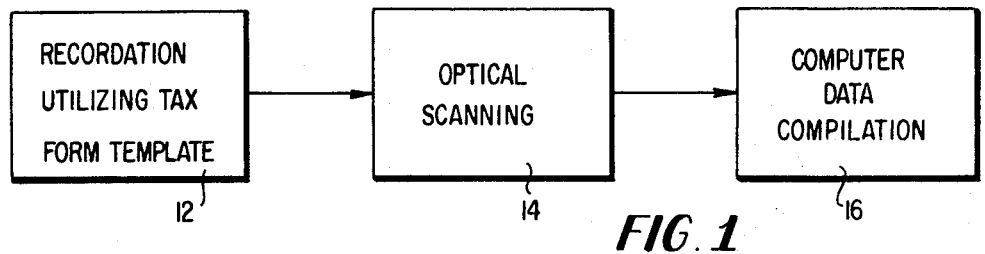
FIG. 1 is a block diagram illustrating three of the steps of the method of the instant invention.

Referring to the drawing in particular, FIG. 1 illustrates a block diagram of three of the steps of the method of the present invention. Firstly, the tax data for a particular taxpayer is manually recorded on a record medium which is to be optically scanned. This recordation is effected utilizing a tax form template as will be more fully explained hereinafter. This step is represented by box 12 in FIG. 1 which is designated "Recordation Utilizing Tax Form Template."

After the data has been manually recorded upon the record medium utilizing the tax form template, the record medium is processed by an optical scanner in order to transfer the manually recorded information from the record medium to a computer input. This step is represented by box 14 in FIG. 1 which is designated "Optical Scanning." In this regard it is noted that an Optical Scanner such as the Model 300 Multi-Font Page Reader Optical Scanner manufactured by the Scan Data Corporation of Los Angeles, Calif. may be utilized. However, the present invention is obviously not restricted to the use of a particular optical scanner as any suitable optical scanner capable of identifying data representative indicia could be utilized.

After the manually recorded data has been translated into computer machine language and introduced into the computer, the suitable programmed computer utilizes the data to prepare a tax return. This step is represented by box 16 in FIG. 1 which is designated "Computer DATA Compilation."

Figure 2:
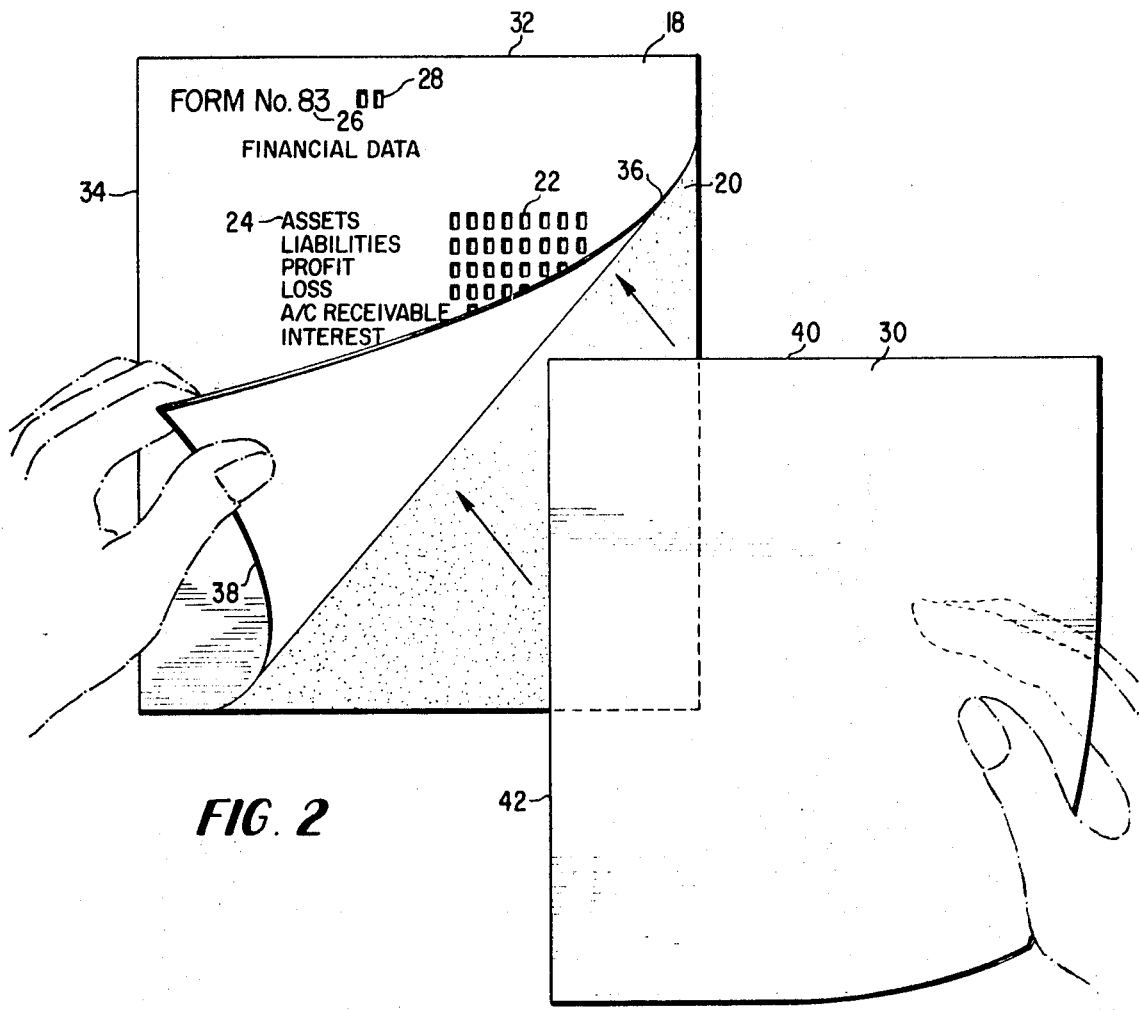
FIG. 2 illustrates a particular tax form template and the insertion of a record medium between the tax form template and the backing sheet.

FIG. 2 illustrates a particular tax form template 18 with tax form information 24 imprinted on the face thereof. Tax form information 24 is aligned in a predetermined manner with apertures 22. Although apertures 22 are shown as rectangularly shaped in FIG. 2, square, circular or other configurations could also be utilized. In the preferred embodiment, tax form template 18 is comprised of a plastic material. However, it is obvious that other suitable materials may be utilized. In this regard, it is noted that the template material must be sufficiently pliable in order that it may be partially separated from the backing medium as shown in FIG. 2.

As shown in FIG. 2, tax form template 18 is a four sided planar figure having edges 32, 34, 36 and 38. A backing sheet 20 is affixed to tax form template 18 at adjacent edges 32 and 34. Also shown in FIG. 2, edges 36 and 38 of tax form template 18 are freely displaceable with respect to backing sheet 20.

Record medium 30 is of the same size as tax form template 18. Therefore, record medium 30 may readily be inserted between tax form template 18 and backing sheet 20 by aligning edges 40 and 42 of record medium 30 with edges 32 and 34 of tax form template 18. The alignment of edges 40 and 42 of record medium 30 with edges 32 and 34 of tax form template 18 provides the necessary alignment for the optical scanning of record medium 30 since apertures 22 will also be in alignment with the edges of record medium 30. Record medium 30 may be comprised of any material that may be optically scanned. In this regard, conventional stationary has been found to be suitable. Recordation upon record medium 30 may be effected with a conventional soft lead pencil or a dark ink pen. Thus, in order to provide for successful optical scanning, it is necessary that a sharp contrast be provided between the record medium 30 and the indicia recorded thereon.

In accordance with the present invention, a plurality of tax form templates may be utilized having different information thereon. Thus, other tax form templates of the set will be of the same size as template 18 but will contain different tax form information on the faces thereof. The use of a set of tax form templates permits the utilization of interchangeable record media therewith. Thus, a record medium such as record medium 30 may be utilized with any one of the set of tax form templates. Therefore, a significant savings with respect to printing costs is achieved. In addition, the necessity to maintain a stock of various printed forms is eliminated.

Since interchangeable record media are utilized with the set of tax form templates, it is important that each recorded record medium indicate which tax form template was utilized to effect the recordation. Therefore, as shown in FIG. 2, form designation 26 and form designation apertures 28 are provided. Thus, before effecting manual recordation utilizing tax form template 18 as shown in FIG. 2, the designation "83" is manually recorded upon record medium 30 through apertures 28 thereby indicating that recordation of record medium 30 was effected utilizing tax form template No. 83. Accordingly, the information fed into the computer indicates that the data read from this record medium corresponds to the information imprinted on the face of tax form template No. 83.

From the above, it may be readily seen that the method of the present invention achieves many desirable objectives. For example, the utilization of a tax form template restricts the areas of recordation to predetermined areas. Since these areas may be readily scanned by an optical scanner without appreciable fear of error, the manually recorded information upon the record medium may be translated into computer machine language without the need for costly and time-consuming keypunching.

Another advantage of the present invention is a large reduction in printing costs. The information to be printed need be printed only once upon the face of a template. Thus, there is no need to print a large number of copies of a particular tax form. Furthermore, there is no need to maintain an accessible stock of numerous copies of the various printed forms. This is because an interchangeable record medium may be utilized with each one of the tax form templates of the set. This results in the release of storage space which may be advantageously utilized for other purposes. Other advantages achieved by the present invention will be obvious to those skilled in the art.

The present invention may be embodied in other specific forms without departing from the spirit or essential attributes thereof. For example, although the invention has been described with respect to a tax data compilation, the invention could readily be utilized for processing other forms of information.

We claim:

1. A method for preparing a computer data compilation comprising the steps of aligning a record medium in a predetermined manner with a template having instructional information thereon representative of the nature of the data to be recorded, the instructional information being aligned with designated openings in the template, manually recording alphanumeric data on the record medium through openings in the template, aligning the record medium with the alphanumeric data thereon in a predetermined manner for passage by an optical scanner, optically scanning the alphanumeric data recorded on the record medium, identifying the alphanumeric data, generating signals representative of the alphanumeric data, transmitting the generated signals to a computer input and storing the signals representative of the alphanumeric data in the computer thereby preparing a computer data compilation.

2. A method for preparing a computer data compilation in accordance with claim 1 further including the steps of aligning a second record medium in a predetermined manner with a second template having information thereon, the second record medium in its unrecorded form being substantially similar in all respects to the first mentioned record medium in its unrecorded form, the second template containing information thereon representative of the nature of the data to be recorded on the second record medium which information is dissimilar with respect to the information contained on the first-mentioned template, the instructional information on the second template being aligned with designated openings in the second template, manually recording alphanumeric data on the second record medium through openings in the second template, aligning the second record medium with the alphanumeric data thereon in a predetermined manner for passage by the optical scanner, optically scanning the alphanumeric data recorded on the second record medium, identifying the alphanumeric data on the second record medium, generating signals representative of the alphanumeric data on the second record medium, transmitting the signals generated from the second record medium to the computer input and storing the signals representative of the alphanumeric data on the second medium in the computer thereby preparing a computer data compilation.

3. A method for preparing a computer data compilation in accordance with claim 2 wherein the first-mentioned template has information thereon and at least one respective opening therein for identifying the use of the first mentioned record medium with the first template and the second template has information thereon and at least one respective opening therein for identifying the use of the second record medium with the second template.